April 17, 1934.   P. RILEY   1,955,656

CHANGE SPEED GEAR MECHANISM

Filed March 2, 1933

Inventor:
Percy Riley
By Mawhinney & Mawhinney
Attys.

Patented Apr. 17, 1934

1,955,656

UNITED STATES PATENT OFFICE 1,955,656

CHANGE-SPEED GEAR MECHANISM

Percy Riley, Coventry, England

Application March 2, 1933, Serial No. 659,395
In Great Britain March 23, 1932

1 Claim. (Cl. 74—57)

This invention relates to change-speed gear mechanism, and particularly to the kind having co-axial driving and driven shafts, which can be slidably clutched directly together, or indirectly through a parallel layshaft and two constant-mesh gear-pairs, to give, say, top speed and an indirect speed, and a gear-pair for another speed, usually a lower speed, of which one gear is slidable into and out of mesh with the other.

The chief object of the present invention is to provide an improved arrangement of this kind in which, when all the gears have helical teeth to ensure silent running, the end-thrusts will be self-contained with regard to the layshaft and striking forks or equivalent members by which the gears or clutch members are slid axially into and out of mesh with the co-operating elements.

According to the main feature of the invention, the slidable clutching member for direct drive has a helical keyed or like connection with the driven shaft, and the dogs on the slidable clutching member and the co-operating dogs are inclined, as necessary, so that the end-thrusts on the slidable clutching member when the dogs are engaged will be substantially balanced.

In the accompanying drawing:—

Figure 1:
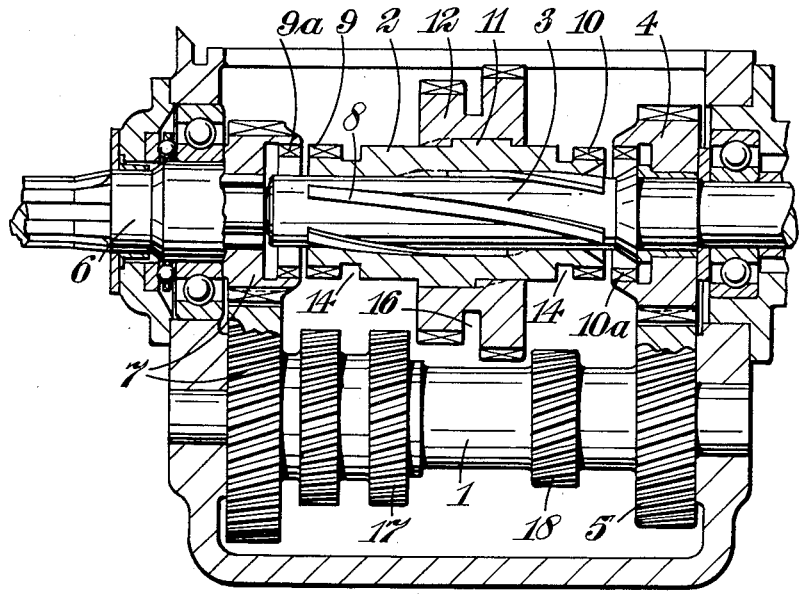
Figure 2:
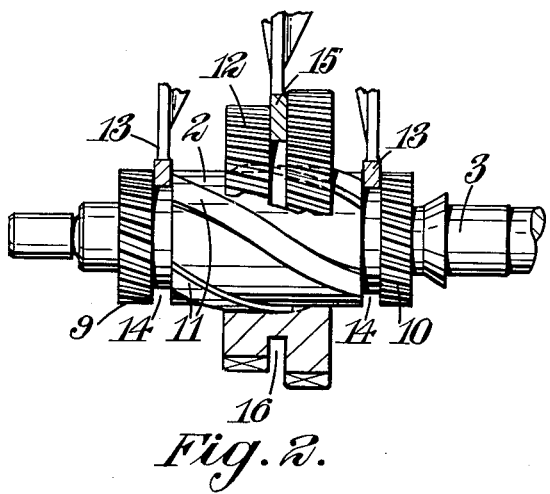

Figure 1 is a longitudinal section through one form of gear-box according to the invention, the gear elements on the driven shaft being shown in section and the selector mechanism and striking fork rods being omitted; and Figure 2 is a part-sectional elevation of the slidable clutching member and the slidable gear on the driven shaft, showing also portions of the striking forks.

In the construction illustrated, the invention is applied to a gear-box of the type described in British patent specification No. 257,413, in respect whereof I am the patentee, when this is adapted substantially in the manner described in U. S. A. patent specification No. 1,889,700, where all the gears have helical teeth, and helical splines or the like are provided so that the end-thrusts on the layshaft and on the striking forks will be substantially balanced.

The slidable clutching member 2 on the driven shaft 3 is a sleeve which in one position locks the driving and driven shafts together to provide top speed, and in its other position locks to the driven shaft a constantly-driven free gear 4 thereof to provide third speed. This free gear 4 constantly meshes with the gear 5 fast on the layshaft 1 which latter is constantly connected with the driving shaft 6 by the gear-pair 7.

In accordance with the present invention, the sleeve is helically splined on the driven shaft, as shown at 8, and at each end its dogs 9, 10 are inclined, as are also the mating dogs 9a, 10a, so that the end-thrusts applied to the sleeve in either of its end positions will be substantially balanced out, thus relieving the striking fork, 13, which is here shown as being duplicated to engage both the grooves 14, of any material load during the direct or indirect drives. The former is obtained through the dogs 9, 9a, the latter through the dogs 10, 10a.

On the surface of the sleeve are helical splines 11 engaged by the sliding gear 12, which is here shown as being a duplicate gear for use in obtaining second and first speeds when meshed with the gears 17 and 18, respectively, fast on the layshaft. The inclination of the external splines 11 on the sleeve is approximately proportioned to the helix angles of the teeth of the sliding gear 12 so that there will be substantially no net end-thrust applied to the latter when the drive is being taken through it, thus relieving the striking fork 15, engaged in the groove 16, of any material load when second or first speed is engaged.

Also, the thrusts from the sets of splines 8 and 11 acting internally and externally on the sleeve are opposed to one another, so that substantially no load will be applied to the striking fork 13 for top and third speed while second or first speed is engaged.

Thus, the invention provides a gear-box which is quiet at all speeds, and the end-thrusts due to the use of helical teeth are opposed as regards the layshaft and the striking forks, so that wear will be reduced; and no special provision for holding the gear lever in the different gear positions is necessary.

What I claim as my invention and desire to secure by Letters Patent of the United States is:—

In a change-speed mechanism, a shaft, helical splines on the exterior of said shaft, a sleeve slidable on said splines and having dogs adjacent opposite ends thereof, a driving means having dogs adapted to be selectively engaged by the dogs on the sleeve in the extreme positions of said sleeve, said dogs being inclined so that when either set is meshed the end thrusts applied to said sleeve by said meshing dogs and said helical splines will be opposed, said driving means including a gear having helical teeth, helical splines on the exterior of said sleeve, and a gear having helical teeth and slidable on said splines and adapted to mesh with the gear of said driving means, said teeth and the splines on the sleeve being so formed and arranged that the end thrusts applied to the gear on the sleeve, when the drive is being transmitted through said gears, are opposed.

PERCY RILEY.